(12) United States Patent
Jung et al.

(10) Patent No.: US 11,848,415 B2
(45) Date of Patent: *Dec. 19, 2023

(54) ALL SOLID BATTERY

(71) Applicant: SAMSUNG ELECTRO-MECHANICS CO., LTD., Suwon-si (KR)

(72) Inventors: Chang Ryul Jung, Suwon-si (KR); Kyung Lock Kim, Suwon-si (KR); Jong Sik Yoon, Suwon-si (KR); Chang Hak Choi, Suwon-si (KR); Byeong Cheol Moon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,765

(22) Filed: Aug. 12, 2022

(65) Prior Publication Data
US 2022/0384845 A1 Dec. 1, 2022

Related U.S. Application Data

(62) Division of application No. 16/820,155, filed on Mar. 16, 2020, now Pat. No. 11,469,444.

(30) Foreign Application Priority Data

Oct. 16, 2019 (KR) .................. 10-2019-0128545

(51) Int. Cl.
*H01M 10/0562* (2010.01)
*H01M 10/0525* (2010.01)
*H01M 10/04* (2006.01)

(52) U.S. Cl.
CPC ..... *H01M 10/0562* (2013.01); *H01M 10/045* (2013.01); *H01M 10/0525* (2013.01)

(58) Field of Classification Search
CPC .......... H01M 10/0562; H01M 10/045; H01M 10/0525; H01M 10/0463; H01M 50/548;
(Continued)

(56) References Cited

U.S. PATENT DOCUMENTS

| 4,916,035 A | 4/1990 | Yamashita |
| 5,339,068 A | 8/1994 | Tsunoda |

(Continued)

FOREIGN PATENT DOCUMENTS

| CN | 103947015 A | 7/2014 | |
| FR | 2956926 A1 * | 9/2011 | ........ H01M 10/0436 |

(Continued)

OTHER PUBLICATIONS

U.S. Notice of Allowance dated May 27, 2022 issued in U.S. Appl. No. 16/820,155.

(Continued)

*Primary Examiner* — Kaity V Chandler
(74) *Attorney, Agent, or Firm* — Morgan, Lewis & Bockius LLP

(57) ABSTRACT

An all-solid-state battery includes a body including a solid electrolyte layer, and an anode layer and a cathode layer alternately stacked with the solid electrolyte layer interposed therebetween. A first external electrode is disposed on one side of the body and includes a first electrode layer and a first conductive resin layer disposed on the first electrode layer, and a second external electrode is disposed on another side of the body and includes a second electrode layer and a second conductive resin layer disposed on the second electrode layer. A protective layer is disposed on an entirety of an external surface of the body free of the first and second electrode layers and on the first and second electrode layers, and at least one opening is included in a region of the (Continued)

protective layer disposed on at least one of the first electrode layer and the second electrode layer.

18 Claims, 6 Drawing Sheets

(58) Field of Classification Search
CPC ............ H01M 50/553; H01M 50/562; H01M 10/052; H01M 2300/0068; H01M 10/0585; H01M 2300/0071; Y02E 60/10; Y02P 70/50
See application file for complete search history.

(56) References Cited

U.S. PATENT DOCUMENTS

| | | |
|---|---|---|
| 5,494,762 A | 2/1996 | Isoyama |
| 6,362,723 B1 | 3/2002 | Kawase |
| 6,373,683 B1 | 4/2002 | Higuchi |
| 6,535,105 B2 | 3/2003 | Heistand |
| 6,645,675 B1 | 11/2003 | Munshi |
| 6,664,006 B1 | 12/2003 | Munshi |
| 8,584,348 B2 | 11/2013 | Wei |
| 10,366,834 B1 | 7/2019 | Lee et al. |
| 11,264,177 B2 | 3/2022 | Saruban |
| 11,302,480 B2 | 4/2022 | Takahashi |
| 2003/0232248 A1 | 12/2003 | Iwamoto |
| 2004/0042157 A1 | 3/2004 | Arai |
| 2005/0073818 A1 | 4/2005 | Hirano |
| 2007/0259271 A1 | 11/2007 | Nanno |
| 2008/0130199 A1 | 6/2008 | Omura |
| 2010/0290172 A1 | 11/2010 | Motoki |
| 2011/0051314 A1 | 3/2011 | Sakurai |
| 2012/0276439 A1 | 11/2012 | Fujita |
| 2015/0279566 A1 | 10/2015 | Otani |
| 2016/0149261 A1 | 5/2016 | Zaghib et al. |
| 2017/0162860 A1 | 6/2017 | Gaben |
| 2017/0352923 A1 | 12/2017 | Iwano et al. |
| 2018/0082785 A1 | 3/2018 | Asano |
| 2018/0082787 A1 | 3/2018 | Hamamori |
| 2018/0166215 A1 | 6/2018 | Hamanaka |
| 2019/0131076 A1 | 5/2019 | Fukumura |
| 2020/0287204 A1 | 9/2020 | Kawaura |
| 2021/0194055 A1 | 6/2021 | Ansari |

FOREIGN PATENT DOCUMENTS

| | | |
|---|---|---|
| JP | H09-237639 A | 9/1997 |
| KR | 10-2016-0021831 A | 2/2016 |
| KR | 10-2017-0136433 A | 12/2017 |
| KR | 10-2019-0049479 A | 5/2019 |
| KR | 10-2019-0114702 A | 10/2019 |

OTHER PUBLICATIONS

U.S. Office Action dated Sep. 18, 2020 issued in U.S. Appl. No. 16/820,155.

Office Action issued in corresponding Korean Patent Application No. 10-2019-0128545 dated Sep. 18, 2020, with English translation.

* cited by examiner

ALL SOLID BATTERY

CROSS-REFERENCE TO RELATED APPLICATION(S)

This application is a divisional patent application of U.S. patent application Ser. No. 16/820,155, filed on Mar. 16, 2020, which claims benefit of priority to Korean Patent Application No. 10-2019-0128545 filed on Oct. 16, 2019 in the Korean Intellectual Property Office, the disclosures of which are incorporated herein by reference in its entirety.

BACKGROUND

1. Field

The present inventive concept relates to an all-solid-state battery.

2. Description of Related Art

Li-ion batteries with high energy density are used to power portable electronic devices such as laptops and smartphones.

Recently, Li-ion batteries have been used in hybrid vehicles, power storage devices, and the like, and have been enlarged. In this case, higher energy density and output density are required, and thus safety issues are drawing attention.

In order to address the safety concerns associated with Li-ion batteries having large sizes and high energy density, all-solid-state batteries using non-flammable or flame-retardant solid electrolyte are under development. Since a flammable organic liquid electrolyte according to the related art is not used, it is expected that battery safety will be drastically improved.

In this situation, a problem may arise due to the reaction of sulfide or oxide materials, used as solid electrolytes, with moisture in the atmosphere.

Therefore, in the all-solid-state battery currently under development, research into solving problems caused by the reaction of electrolyte materials with moisture and improving product reliability is required.

In detail, in the case of a sintered chip all-solid-state battery, plating of an external electrode is used to enable mounting on a substrate. In this case, degeneration of an electrolyte material, which may occur due to the penetration of a plating solution, may cause deterioration of the characteristics and reliability of the product, so that research thereinto is required.

SUMMARY

An aspect of the present inventive concept is to provide an all-solid-state battery with improved moisture resistance reliability.

According to an aspect of the present inventive concept, an all-solid-state battery includes a body including a solid electrolyte layer, and an anode layer and a cathode layer alternately stacked with the solid electrolyte layer interposed therebetween, and having a first surface and a second surface opposing each other in the stacking direction, a third surface and a fourth surface connected to the first surface and the second surface and opposing each other, and a fifth surface and a sixth surface connected to the first to fourth surfaces and opposing each other. A first external electrode is disposed on one side of the body, and includes a first electrode layer and a first conductive resin layer disposed on the first electrode layer, and a second external electrode is disposed on another side of the body, and includes a second electrode layer and a second conductive resin layer disposed on the second electrode layer. A protective layer is disposed on an entirety of an external surface of the body free of the first and second electrode layers, and on the first electrode layer and the second electrode layer, and at least one opening is included in a region of the protective layer disposed on at least one of the first electrode layer and the second electrode layer.

According to another aspect of the present inventive concept, an all-solid-state battery includes a body including a solid electrolyte layer, and an anode layer and a cathode layer alternately stacked with the solid electrolyte layer interposed therebetween, and having a first surface and a second surface opposing each other in a stacking direction, a third surface and a fourth surface connected to the first surface and the second surface and opposing each other, and a fifth surface and a sixth surface connected to the first to fourth surfaces and opposing each other. A first external electrode is disposed on one side of the body, and includes a first electrode layer, and a second external electrode is disposed on another side of the body, and includes a second electrode layer. A protective layer is disposed on an external surface of the body free of the first and second electrode layers.

According to another aspect of the present inventive concept, an all-solid-state battery includes a body including a plurality of anode layers and a plurality of cathode layers that are alternately stacked with solid electrolyte layers disposed therebetween on opposing surfaces of each anode and cathode layer. First and second electrode layers are disposed on respective external surfaces of the body and respectively connected to the plurality of anode layers and the plurality of cathode layers. A protective layer is disposed on external surfaces of the body to cover an entirety of all external surfaces of the body free of the first and second electrode layers.

BRIEF DESCRIPTION OF DRAWINGS

The above and other aspects, features and other advantages of the present disclosure will be more clearly understood from the following detailed description, taken in conjunction with the accompanying drawings, in which.

DETAILED DESCRIPTION

Figure 1:
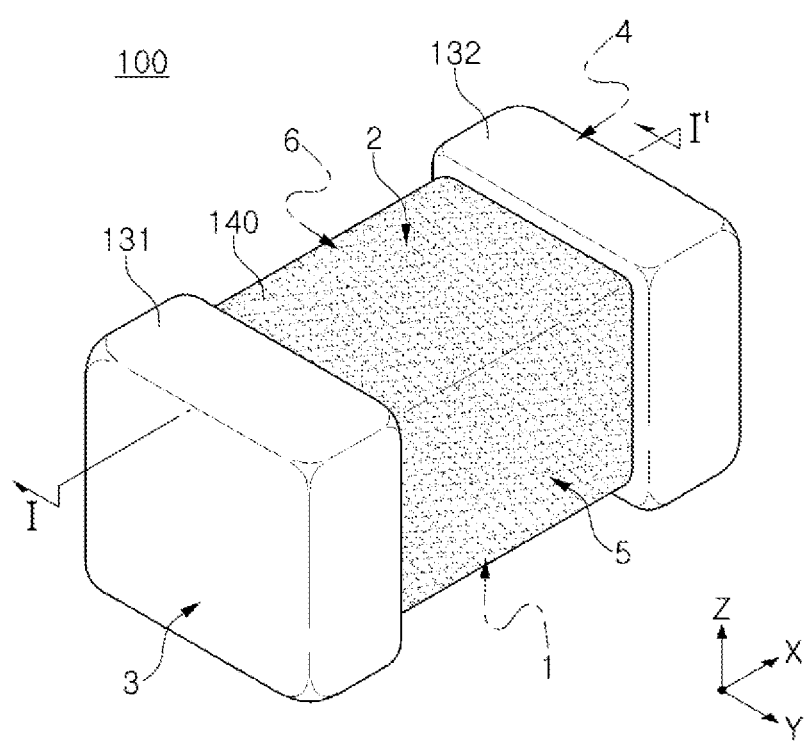
FIG. 1 is a schematic perspective view illustrating an all-solid-state battery according to an embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region, or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers, and/or sections, these members, components, regions, layers, and/or sections should not be limited by these terms. These terms are only used to distinguish one member, component, region, layer, or section from another region, layer, or section. Thus, a first member, component, region, layer, or section discussed below could be termed a second member, component, region, layer, or section without departing from the teachings of the exemplary embodiments.

Spatially relative terms, such as "above," "upper," "below," and "lower" and the like, may be used herein for ease of description to describe one element's positional relationship to other element(s) in the orientation shown in the figures. It will be understood that the spatially relative terms are intended to encompass different orientations of the device in use or operation in addition to the orientation depicted in the figures. For example, if the device in the figures is turned over, elements described as "above" or "upper" relative to other elements would then be oriented "below" or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, and may for example be understood to include a change in shape results from manufacturing. The following embodiments may also be constituted by one or a combination thereof.

The contents of the present disclosure described below may have a variety of configurations and while only an illustrative configuration is described herein, the disclosure is not limited thereto.

In the drawings, the X direction may be defined as a second direction, an L direction, or a longitudinal direction, the Y direction may be defined as a third direction, a W direction, or a width direction, and the Z direction may be defined as a first direction, a stacking direction, a T direction, or a thickness direction.

All-Solid-State Battery

FIG. 1 is a schematic perspective view illustrating an all-solid-state battery according to an embodiment of the present disclosure.

Figure 2A:
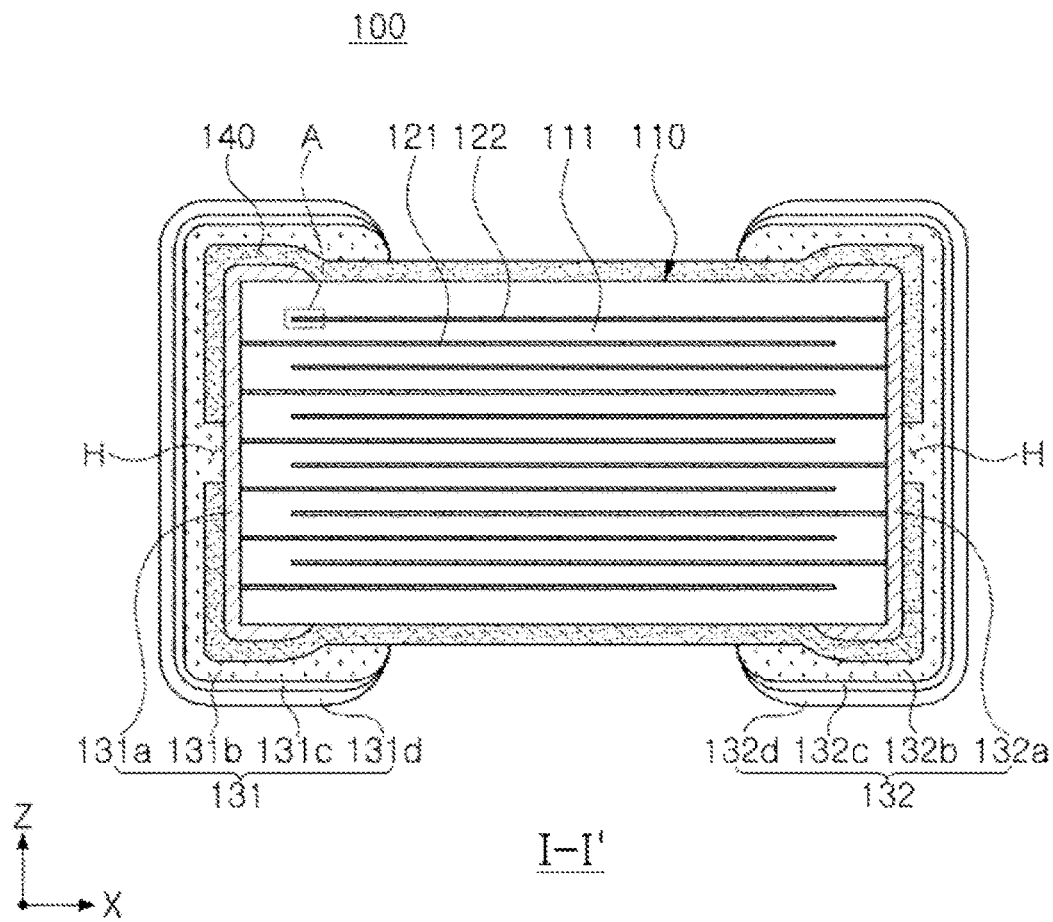
FIG. 2A is a cross-sectional view taken along line I-I' of FIG. 1.
Figure 2B:
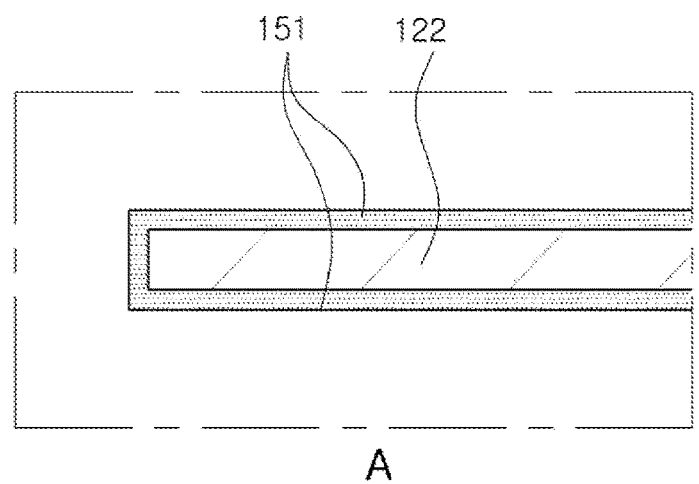
FIG. 2B is an enlarged diagram illustrating region A illustrated in FIG. 2A.

FIG. 2 is a cross-sectional view taken along line I-I' of FIG. 1.

Hereinafter, referring to FIGS. 1 and 2, an all-solid-state battery 100 according to an embodiment of the present disclosure will be described.

The all-solid-state battery 100 according to an embodiment of the present disclosure includes a body 110 including a solid electrolyte layer 111, and an anode layer 121 and a cathode layer 122 alternately stacked with the solid electrolyte layer 111 interposed therebetween, and having a first surface 1 and a second surface 2 opposing each other in the stacking direction, a third surface 3 and a fourth surface 4 connected to the first and second surfaces and opposing each other, and a fifth surface 5 and a sixth surface 6 connected to the first to fourth surfaces and opposing each other, a first external electrode 131 disposed on one side of the body 110, and including a first electrode layer 131a and a first conductive resin layer 131b disposed on the first electrode layer 131a, a second external electrode 132 disposed on the other side of the body 110, and including a second electrode layer 132a and a second conductive resin layer 132b disposed on the second electrode layer 132a, and a protective layer 140 disposed on an external surface of the body 110 and the entirety of the first electrode layer 131a and the second electrode layer 132a, and at least one opening H is included in a region of the protective layer 140 disposed on the first electrode layer 131a and the second electrode layer 132a.

The solid electrolyte layer 111, the anode layer 121, and the cathode layer 122 are alternately stacked in the body 110.

Each of the solid electrolyte layer 111, the anode layer 121, and the cathode layer 122 is provided as one, and may have a structure in which the anode layer 121 is disposed on one surface of the solid electrolyte layer 111, and the cathode layer 122 is disposed on the other surface thereof.

Alternatively, the solid electrolyte layer 111, the anode layer 121, and the cathode layer 122 are provided as a plurality of solid electrolyte layers 111, a plurality of anode layers 121, and a plurality of cathode layers 122, and may have a structure in which the anode layer 121 and the cathode layer 122 are alternately stacked with the solid electrolyte layer 111 interposed therebetween.

A shape of the body 110 is not particularly limited, but may be a hexahedral shape or a shape similar to the hexahedral shape, as illustrated in FIG. 1.

The body 110 may have the first and second surfaces 1 and 2 opposing each other in the thickness direction (the Z direction), the third and fourth surfaces 3 and 4 connected to the first and second surfaces 1 and 2 and opposing each other in the longitudinal direction (the X direction), and the fifth and sixth surfaces 5 and 6 connected to the first and second surfaces 1 and 2, connected to the third and fourth surfaces 3 and 4, and opposing each other in the width direction (the Y direction).

A plurality of solid electrolyte layers 111, forming the body 110, are not particularly limited as long as the solid electrolyte layers are oxide-based solid electrolytes. For example, the solid electrolyte layers may include an oxide-based solid electrolyte which is a glass ceramic based material and having an NASICON (e.g., sodium (Na) Super Ionic CONductor) structure which can be sintered under 1000° C. or less.

The oxide-based solid electrolyte having the NASICON structure has a high conductivity while being stable in the air.

The oxide-based solid electrolyte having the NASICON structure may be, for example, phosphate with lithium.

In detail, the phosphate may be a lithium phosphate salt mixed with Ti ($Li_{1+x}Al_xTi_{2-x}(PO_4)_3$), or the like.

Alternatively, a portion or the entirety of Ti may be substituted with a tetravalent transition metal such as Ge, Sn, Hf, Zr, or the like.

Alternatively, in order to increase the content of Li, a portion of Ti may be substituted with a trivalent transition metal such as Al, Ga, In, Y, La, or the like.

The phosphate containing lithium (Li) and having an NASICON structure is, more particularly, an Li—Al—Ge—$PO_4$-based material, for example, $Li_{1+x}Al_xGe_{2-x}(PO_4)_3$, $Li_{1+x}Al_xZr_{2-x}(PO_4)_3$, $Li_{1+x}Al_xTi_{2-x}(PO_4)_3$, or the like.

In detail, it is preferable that the Li—Al—Ge—$PO_4$-based material, to which a transition metal such as a transition metal included in the anode layer 121 and the cathode layer 122 is added in advance, is used as a material of the solid electrolyte layer 111.

For example, when the anode layer 121 and the cathode layer 122 include a phosphate containing Co and Li, it is preferable that a Li—Al—Ge—$PO_4$-based material, to which Co is added in advance, is included in the solid electrolyte layer 111. In this case, elution of a transition metal, included in an electrode active material, into an electrolyte can be suppressed.

As described above, a material of the solid electrolyte layer 111 may be various oxide-based solid electrolytes. As a specific example, the oxide-based solid electrolyte may be $Li_{1.5}Al_{0.5}Ge_{1.5}(PO_4)_3$ (LAGP), $Li_{1.3}Al_{0.3}Ti_{1.7}(PO_4)_3$ (LATP), or the like.

The anode layer 121 and the cathode layer 122 are disposed to oppose or face and overlap each other with the solid electrolyte layer 111 interposed therebetween.

The anode layer 121 and the cathode layer 122 may be alternatively disposed to oppose each other with a solid electrolyte layer interposed therebetween.

The anode layer 121 and the cathode layer 122 may be exposed to the third surface 3 and the fourth surface 4 of the body 110, respectively.

Referring to FIG. 2, the anode layer 121 is spaced apart from the fourth surface 4 and exposed through the third surface 3 of the body 110, while the cathode layer 122 is spaced apart from the third surface and exposed through the fourth surface 4 of the body 110. The first external electrode 131 is disposed on the third surface 3 of the body 110 to be connected to the anode layer 121, while the second external electrode 132 is disposed on the fourth surface 4 of the body 110 to be connected to the cathode layer 122.

That is, the anode layer 121 is not connected to the second external electrode 132 and is connected to the first external electrode 131, while the cathode layer 122 is not connected to the first external electrode 131 and is connected to the second external electrode 132. Thus, the anode layer 121 is formed to be spaced apart from the fourth surface 4 by a predetermined distance, while the cathode layer 122 is formed to be spaced apart from the third surface 3 by a predetermined distance.

The anode layer 121 and the cathode layer 122 may be electrically separated from each other by the solid electrolyte layer 111 disposed in the middle.

A material forming the anode layer 121 and the cathode layer 122 is not particularly limited, and may be formed using, for example, conductive paste containing an active electrode material, a $Li_3BO_3$ (LBO) precursor, and metallic powder.

The active electrode material may be a known material as a material used for anode and cathode layers serving as active electrode layers of an all-solid-state battery.

For example, the active electrode material may be $LiCoPO_4$ containing Co. In the material, phosphate, in which Co, a transition metal, is substituted, may be used as an active electrode material. The transition metal may be Mn, Fe, and Ni in addition to Co.

Moreover, regarding the transition metal, the anode layer 121 and the cathode layer 122 may include the same metal, and the anode layer 121 and the cathode layer 122 may include transition metals different from each other. Moreover, two or more types of transition metals may be included in the anode layer 121 and the cathode layer 122.

In detail, when the same active electrode material, included in the anode layer 121 and the cathode layer 122, is used, compositions of both electrode layers are the same, so it is preferable because there is no problem of malfunction due to polarity after formation of an external electrode of an all-solid-state battery.

Meanwhile, an active electrode material of the anode layer 121 may be, for example, $LiCoO_2$, $LiCoPO_4$, $LiMn_2O_4$, $LiNi_{0.05}O_2$, $LiNi_xMn_yCo_{1-x-y}O_2$, $LiFePO_4$, of the like.

Moreover, an active electrode material of the cathode layer 122 may be, for example, Li-metal, graphite, graphite/silicone, $Li_4Ti_5O_{12}$, or the like.

All the anode layer 121 and the cathode layer 122 include a $Li_3BO_3$ (LBO) precursor.

According to an embodiment of the present disclosure, the anode layer 121 and the cathode layer 122 include an active electrode material and a $Li_3BO_3$ (LBO) precursor, and may further include metallic powder.

The metallic powder may be Ag, Cu, Pt, Ni or Ag—Pd, Ag—Pt, Ag—Cu alloys, or the like, and a diameter thereof may be 0.2 µm to 1.0 µm.

Since the anode layer 121 and the cathode layer 122 may further include the metallic powder, there may be an effect in which no additional current collector layer is required.

According to the related art, an all-solid-state battery is provided with an additional current collector layer disposed therein, and, in this case, a problem caused by metal oxidation in a sintering process may occur. However, according to an embodiment of the present disclosure, an additional current collector layer is not required, so the problem described above does not occur.

A method of printing the conductive paste for formation of the anode layer 121 and the cathode layer 122 may be a screen printing method or a gravure printing method, but an embodiment of the present disclosure is not limited thereto.

The external electrodes 131 and 132 are disposed on the body 110, and include electrode layers 131a and 132a and conductive resin layers 131b and 132b.

The external electrodes 131 and 132 may include first and second external electrodes 131 and 132, connected to the first and second internal electrodes 121 and 122, respectively.

The first external electrode 131 includes a first electrode layer 131a and a first conductive resin layer 131b, while the second external electrode 132 includes a second electrode layer 132a and a second conductive resin layer 132b.

When the first external electrode 131 is divided according to a placement position, the first external electrode 131 includes a connection portion disposed on the third surface 3 of the body 110, and a band portion extended from the connection portion to a portion of the first, second, fifth, and sixth surfaces 1, 2, 5, and 6.

When the second external electrode 132 is divided according to a placement position, the second external electrode 132 includes a connection portion disposed on the fourth surface 4 of the body 110, and a band portion extended from the connection portion to another portion of the first, second, fifth, and sixth surfaces 1, 2, 5, and 6.

Meanwhile, the first and second electrode layers 131a and 132a may be formed of any material having electrical conductivity, such as a metal, or the like, and a certain material of each of the first and second electrode layers 131a and 132a may be determined in consideration of electrical characteristics, structural stability, or the like.

For example, the first and second electrode layers 131a and 132a may be formed using a conductive paste including a conductive metal.

The conductive metal, used for the first and second electrode layers 131a and 132a, is not particularly limited as long as the conductive metal is electrically connected to the anode layer 121 and the cathode layer 122. For example, the conductive metal may be one or more selected from the group consisting of copper (Cu), silver (Ag), nickel (Ni), and alloys thereof.

The conductive paste including the conductive metallic powder is applied, and is then sintered to form the first and second electrode layers 131a and 132a.

The first and second conductive resin layers 131b and 132b may include a conductive metal and a base resin.

The conductive metal, included in the first and second conductive resin layers 131b and 132b, may serve to be electrically connected to the first and second electrode layers 131a and 132a.

The conductive metal, included in the first and second conductive resin layers 131b and 132b, is not particularly limited as long as the conductive metal is electrically connected to the first and second electrode layers 131a and 132a. For example, the conductive metal may include one or more selected from the group consisting of copper (Cu), silver (Ag), nickel (Ni), and alloys thereof.

The conductive metal, included in the first and second conductive resin layers 131b and 132b, may include one or more of spherical powder particles and flake powder particles. That is, the conductive metal may only be formed of flake powder particles, may only be formed of spherical powder particles, or may have a form in which flake powder particles and spherical powder particles are mixed.

Here, the spherical powder particles may also include a form which is not a complete sphere, and may include, for example, a form in which a length ratio (a long axis/a short axis) between a long axis and a short axis is 1.45 or less.

The flake powder particles refer to powder particles having a flat and elongated shape, and are not particularly limited. However, for example, a length ratio (a long axis/a short axis) between a long axis and a short axis may be 1.95 or more.

Lengths of a long axis and a short axis of the spherical powder particles and the flake powder particles may be measured from an image obtained by scanning a cross-section in X and Z directions (an L-T cross-section) cut in the center of an all-solid-state battery in a width Y direction using a Scanning Electron Microscope (SEM).

The base resin, included in the first and second conductive resin layers 131b and 132b, serves to secure adhesion and absorb shock.

The base resin, included in the first and second conductive resin layers 131b and 132b, is not particularly limited as long as the base resin has adhesion and shock absorption, and is mixed with conductive metal powder to manufacture paste. For example, the base resin may include an epoxy resin.

Meanwhile, the first external electrode 131 further includes first plating layers 131c and 131d disposed on the first conductive resin layers 131b and 132b, while the second external electrode 132 further includes second plating layers 132c and 132d disposed on the second conductive resin layer 132b.

The first and second plating layers 131c, 131d, 132c, and 132d serve to improve mounting characteristics.

The first and second plating layers 131c, 131d, 132c, and 132d may be a nickel (Ni) plating layer or a tin (Sn) plating layer, and each of the first and second plating layers may have a form in which Ni plating layers 131c and 132c and Sn plating layers 131d and 132d are sequentially formed on the first and second conductive resin layers 131b and 132b, and may include a plurality of Ni plating layers and/or a plurality of Sn plating layers.

The protective layer 140 is disposed on an external surface of the body 110, and on the entirety of the first electrode layer 131a and the second electrode layer 132a with the exception of at least one opening H included in a region of the protective layer 140 disposed on the first electrode layer 131a and the second electrode layer 132a.

The protective layer 140 may serve to improve moisture resistance reliability by blocking a moisture penetration path.

Moreover, the protective layer 140 may prevent moisture from penetrating into the body 110 through an external surface of the body by sealing a fine pore or a crack of the body 110.

In addition, since the protective layer 140 does not include a conductive metal and has insulation characteristics, the protective layer is disposed on an external surface of the body and on the first and second electrode layers 131a and 132a, which is more effective at absorbing shocks and suppressing stress propagation.

In the case of a Li ion battery according to the related art, since an outer package is provided, there is no problem with a moisture resistance defect, so an additional protective layer is not required.

However, in the case of a recent all-solid-state battery, two cases are provided, a form having an outer package and a form having no outer package. Between them, in the case of an all-solid-state battery in the form having an additional outer package, an additional protective layer is not required. However, in the latter case having no outer package, a problem with a moisture resistance defect may occur.

An all-solid-state battery according to an embodiment of the present disclosure is a sintered chip all-solid-state battery having no outer package, and a problem with a moisture resistance defect may occur according the type of an electrolyte used.

According to an embodiment of the present disclosure, the protective layer 140 is disposed on an external surface of the body 110 and on the first electrode layer 131a and the second electrode layer 132a, so a moisture resistance defect is prevented so as to improve reliability.

The protective layer 140 may include one or more among $Al_2O_3$, $SiO_2$, $ZrO_2$, $Ta_2O_3$, $TiO_2$, and $Si_3N_4$.

Accordingly, the protective layer 140 may include one or more among $Al_2O_3/SiO_2$, $Al_2O_3/TiO_2$, and the like.

The $Al_2O_3$ is an advantageous material for formation of a film with high density, and the protective layer 140 includes $Al_2O_3$, so a protective layer with excellent moisture resistance can be formed.

Meanwhile, since $SiO_2$ and $TiO_2$ have excellent effects to adhere to a surface of a body, they may be more advantageous to form a protective layer, as compared with an epoxy resin or an inorganic compound.

In detail, in the case of $Si_3N_4$ including nitride, it is relatively inexpensive as compared with $SiO_2$, but has the same coating properties, so more advantageous effects can be obtained.

However, a material of the protective layer 140 may be any material as long as a material does not have electronic conductivity, and a material does not react with moisture or carbon dioxide in the air, but it is not limited to the materials described above.

The protective layer 140 may be formed using an atomic layer deposition (ALD) process, a spray drying process, a sputtering process, or the like.

In detail, when the protective layer 140 is formed using the atomic layer deposition (ALD) method, it has the advantage of the coating of a thin film even including a significantly small gap.

The protective layer 140 may include a multilayer thin film with two or more layers. When the protective layer 140 is formed using an atomic layer deposition (ALD) method, a spray dry method, a sputtering method, or the like, a thin film could be formed, so the protective layer 140 is formed as a multilayer structure, having at least two layers.

When the protective layer 140 has a form of a multilayer thin film with two or more layers, a moisture resistance improvement effect may be more excellent as compared with a single layer.

A thickness of the protective layer 140 may be 10 nm or more and 200 nm or less. When a thickness of the protective layer 140 is 10 nm or more and 200 nm or less, an all-solid-state battery with excellent moisture resistance reliability can be implemented.

If a thickness of the protective layer 140 is less than 10 nm, a thickness of the protective layer 140 is thin, so a moisture resistance reliability improvement effect is reduced.

Meanwhile, if a thickness of the protective layer 140 exceeds 200 nm, there may be a problem in which an occurrence rate of a plating defect is increased.

According to an embodiment of the present disclosure, at least one opening H is included in regions of the protective layer 140 disposed on the first electrode layer 131a and the second electrode layer 132a.

The first conductive resin layer 131b is in contact with the first electrode layer 131a through the opening H disposed on the first electrode layer 131a, while the second conductive resin layer 132b is in contact with the second electrode layer 132a through the opening H disposed on the second electrode layer 132a. That is, the opening H may be filled with each of the first conductive resin layer 131b and the second conductive resin layer 132b.

In the protective layer 140, the first and second electrode layers 131a and 132a are formed on the body 110 including a solid electrolyte layer 111, an anode layer 121, and a cathode layer 122, and then a protective layer 140 is formed on an exposed external surface of the body 110 and the first and second electrode layers 131a and 132a, and a portion of the protective layer 140, formed on the first and second electrode layers 131a and 132a, is removed to form an opening H.

A method of removing a region in which the opening H is to be formed may be, for example, laser processing, mechanical polishing, dry etching, wet etching, a shadowing deposition method using a tape protective layer, or the like.

In this case, an area of the opening H may be 20% to 90% of an area of each region of the protective layer 140, disposed on a connection portion of the first electrode layer 131a and a connection portion of the second electrode layer 132a.

If the area of the opening H is less than 20% of an area of each region of the protective layer 140, disposed on a connection portion of the first electrode layer 131a and a connection portion of the second electrode layer 132a, electrical connectivity between the first electrode layer 131a and the first conductive resin layer 131b and between the second electrode layer 132a and the second conductive resin layer 132b is reduced, so ESR may be increased.

On the other hand, if the area of the opening H exceeds 90% of an area of each region of the protective layer 140, disposed on a connection portion of the first electrode layer 131a and a connection portion of the second electrode layer 132a, a moisture resistance reliability improvement effect may be insufficient.

Meanwhile, a shape of the opening H is not particularly limited, and may be, for example, a shape such as a circular, quadrangular, oval, or rounded quadrangular shape, or may have an irregular shape.

In addition, the number of the openings H is not particularly limited, and one opening on each of the first electrode layer 131a and the second electrode layer 132a is illustrated in FIG. 2, but it is not necessarily limited thereto, and a plurality of openings (e.g., two or more openings) may be disposed on each electrode layer.

According to an embodiment of the present disclosure, a buffer layer may be further disposed between the solid electrolyte layer 111 and the anode layer 121 and the solid electrolyte layer 111 and the cathode layer 122.

The buffer layer may serve to reduce the resistance of an electrolyte and an electrode interface and to prevent some components in an electrolyte material during the electrochemical reaction from being reduced and moving to a cathode.

Figure 3A:
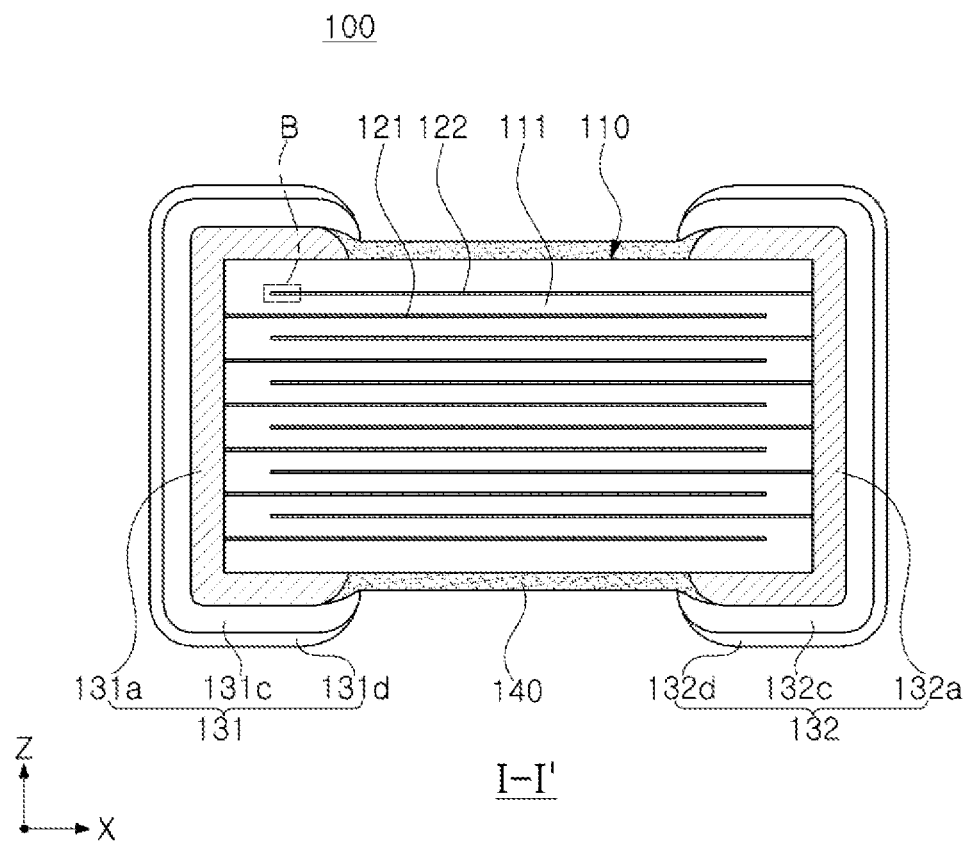
FIG. 3A is a cross-sectional view taken along line I-I' of FIG. 1 according to another embodiment of the present disclosure.
Figure 3B:
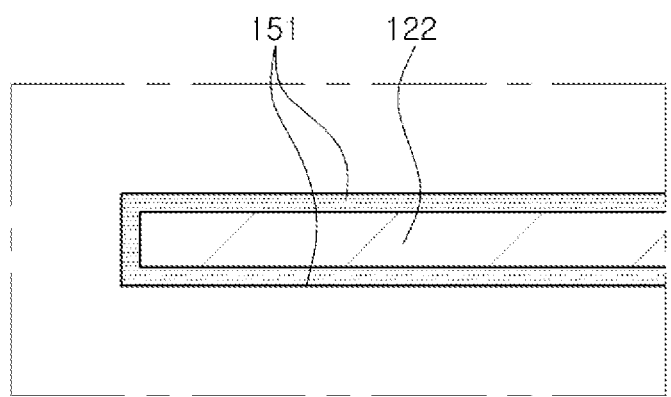
FIG. 3B is an enlarged diagram illustrating region B illustrated in FIG. 3A.

FIG. 3 is a cross-sectional view taken along line I-I' of FIG. 1 according to another embodiment of the present disclosure.

Hereinafter, referring to FIG. 3, an all-solid-state battery 100 according to another embodiment of the present disclosure will be described. However, in order to avoid overlapping descriptions, descriptions common to several of the all-solid-state batteries 100 according to embodiments of the present disclosure are omitted.

The all-solid-state battery 100 according to another embodiment of the present disclosure includes a body 110 including solid electrolyte layer(s) 111, and anode layer(s) 121 and cathode layer (s) 122 alternately stacked with the solid electrolyte layer (s) 111 interposed therebetween, and having a first surface 1 and a second surface 2 opposing each other in the stacking direction, a third surface 3 and a fourth surface 4 connected to the first surface 1 and the second surface 2 and opposing each other, and a fifth surface 5 and a sixth surface 6 connected to the first to fourth surfaces and opposing each other, a first external electrode 131 disposed on one side of the body 110 and including a first electrode layer 131a, a second external electrode 132 disposed on another opposing side of the body 110 and including a second electrode layer 132a, and a protective layer 140 disposed on an external surface of the body 110.

The first and second electrode layers 131a and 132a are formed on the body 110, including a solid electrolyte layer 111, an anode layer 121, and a cathode layer 111, and then a protective layer 140 is formed on an exposed external surface of the body 110 and the first and second electrode layers 131a and 132a, and a portion of the protective layer 140 formed on the first and second electrode layers 131a and 132a is removed therefrom, so the protective layer 140 is disposed on the external surface of the body 110. For example, the protective layer 140 is disposed on all portions of the external surface of the body 110 that are free of the first and second electrode layers 131a and 132a.

A method of removing the protective layer 140 formed on the first and second electrode layers 131a and 132a may be, for example, laser processing, mechanical polishing, dry etching, wet etching, a shadowing deposition method using a tape protective layer, or the like.

Meanwhile, the first external electrode 131 further includes first plating layers 131c and 131d, disposed on the first electrode layer 131a, while the second external electrode 132 further includes second plating layers 132c and 132d, disposed on the second electrode layer 132a.

The first and second plating layers 131c, 131d, 132c, and 132d serve to improve mounting characteristics.

The first and second plating layers 131c, 131d, 132c, and 132d may be a nickel (Ni) plating layer or a tin (Sn) plating layer, and each of the first and second plating layers may have a form in which Ni plating layers 131c and 132c and Sn plating layers 131d and 132d are sequentially formed on the first and second conductive resin layers 131b and 132b, and may include a plurality of Ni plating layers and/or a plurality of Sn plating layers.

According to another embodiment of the present disclosure, the protective layer 140 may be disposed to cover a portion of an end or edge of each of the first electrode layer 131a and the second electrode layer 132a, disposed on the first surface 1 and the second surface 2 of the body 110.

The protective layer 140 is disposed to cover a portion of an end or edge of each of the first electrode layer 131a and the second electrode layer 132a disposed on the first surface 1 and the second surface 2 of the body 110. In this case, when a plating layer is formed, a plating liquid may be prevented from penetrating into ends of the first electrode layer 131a and the second electrode layer 132a. Thus, a moisture resistance reliability improvement effect may be improved.

Method of Manufacturing All-Solid-State Battery

FIGS. 4A to 4E are schematic diagrams illustrating a process of manufacturing an all-solid-state battery according to an embodiment of the present disclosure.

Hereinafter, referring to FIGS. 4A and 4E, a method of manufacturing an all-solid-state battery 100 according to an embodiment of the present disclosure will be described.

Figure 4A:
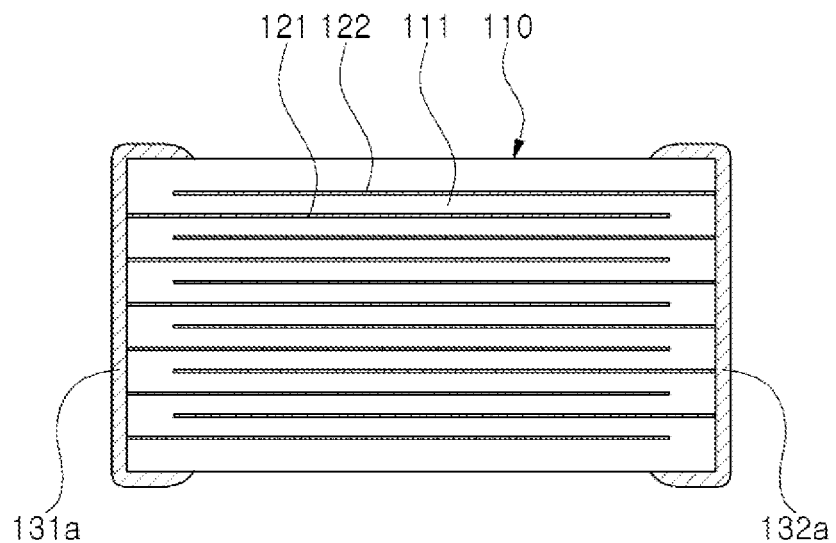
FIGS. 4A to 4E are schematic diagrams illustrating steps of a process of manufacturing an all-solid-state battery according to an embodiment of the present disclosure.

As illustrated in FIG. 4A, according to an embodiment of the present disclosure, a body 110 is formed, the body including one or more solid electrolyte layer(s) 111, and one or more anode layer(s) 121 and cathode layer(s) 122 alternately stacked with the solid electrolyte layer (s) 111 interposed therebetween, and the body 110 is sintered.

A first electrode layer 131a and a second electrode layer 132a are formed on the third surface 3 and the fourth surface 4 of the sintered body 110.

The first electrode layer 131a and the second electrode layer 132a may be formed by applying a conductive paste containing silver (Ag).

Figure 4B:
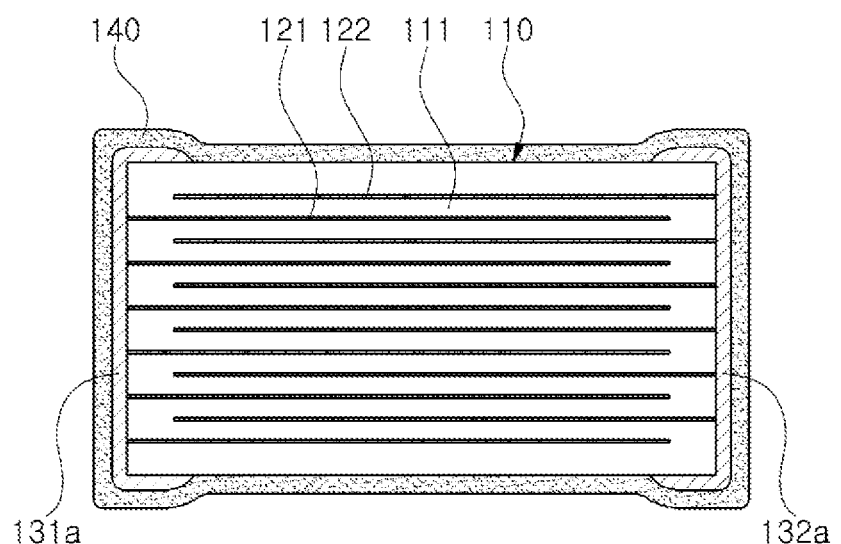

Next, as illustrated in FIG. 4B, a protective layer 140 is formed on an exposed external surface of the body 110 and on the first and second electrode layers 131a and 132a.

A method of forming the protective layer 140 is not particularly limited, and may be, for example, an atomic layer deposition (ALD) process, a spray drying process, a sputtering process, or the like.

Figure 4C:
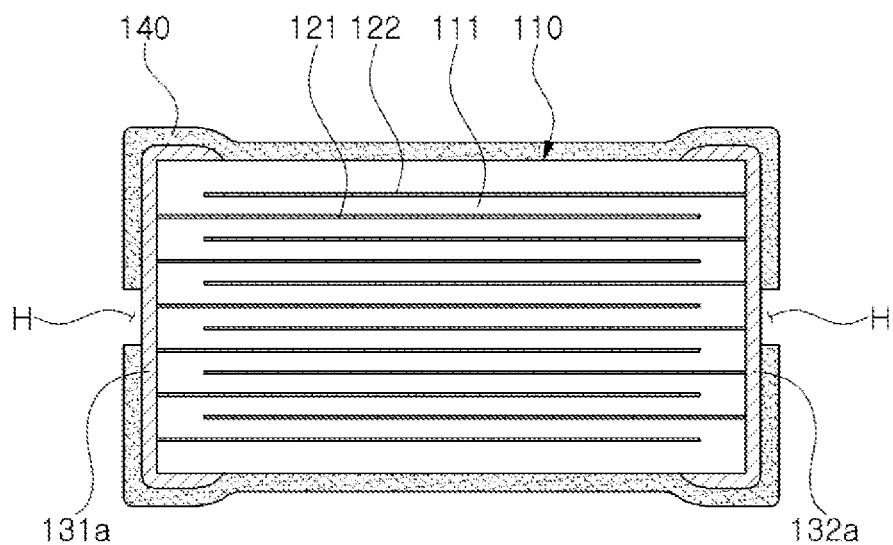

Next, as illustrated in FIG. 4C, a portion of the protective layer 140 formed on each of the first and second electrode layers 131a and 132a is removed to form an opening H.

A method of removing a region in which the opening H is to be formed may be, for example, laser processing, mechanical polishing, dry etching, wet etching, a shadowing deposition method using a tape protective layer, or the like.

Figure 4D:
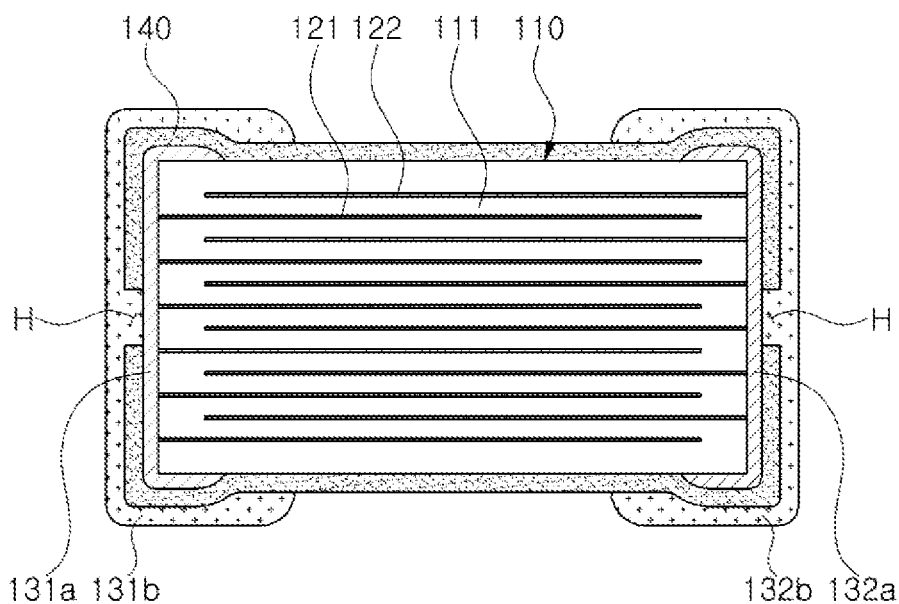

Next, as illustrated in FIG. 4D, a first conductive resin layer 131b is formed on the first electrode layer 131a, while a second conductive resin layer 132b is formed on the second electrode layer 132a.

Figure 4E:
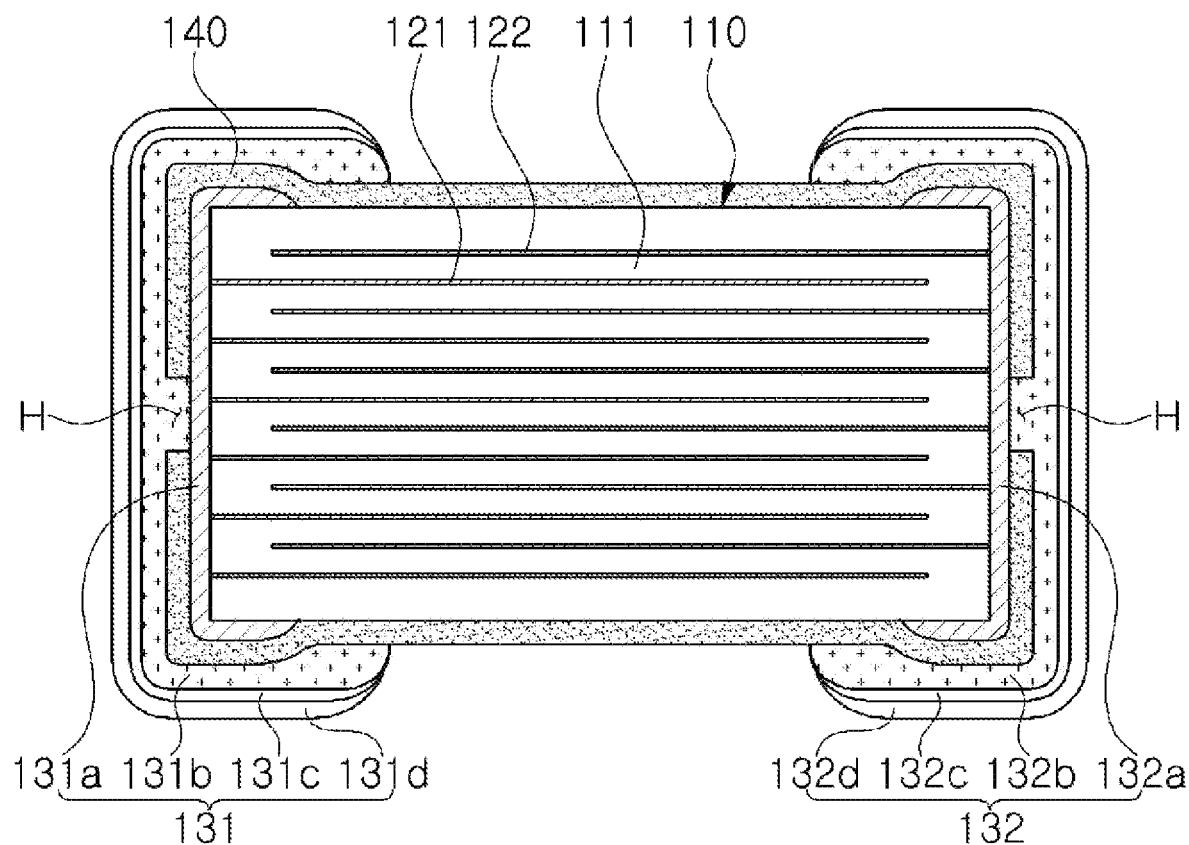

Finally, as illustrated in FIG. 4E, first plating layers 131c and 131d are further formed on the first conductive resin layer 131b, while second plating layers 132c and 132d are further formed on the second conductive resin layer 132b.

The first and second plating layers 131c, 131d, 132c, and 132d serve to improve mounting characteristics.

The first and second plating layers 131c, 131d, 132c, and 132d may be a nickel (Ni) plating layer or a tin (Sn) plating layer, and each of the first and second plating layers may have a form in which Ni plating layers 131c and 132c and Sn plating layers 131d and 132d are sequentially formed on the first and second conductive resin layers 131b and 132b, and may include a plurality of Ni plating layers and/or a plurality of Sn plating layers.

As set forth above, according to example embodiments of the present inventive concept, a protective layer is disposed on an external surface of a body 110 or on an external surface of a body 110 and the entirety of a first electrode layer 131a and a second electrode layer 132a with the exception of an opening H, and thus, an all-solid-state battery with improved moisture resistance reliability may be provided.

While example embodiments have been shown and described above, it will be apparent to those skilled in the art that modifications and variations could be made without departing from the scope of the present disclosure, as defined by the appended claims.

What is claimed is:
1. An all-solid-state battery, comprising:
a body including a solid electrolyte layer, and an anode layer and a cathode layer alternately stacked with the solid electrolyte layer interposed therebetween, and having a first surface and a second surface opposing each other in a stacking direction, a third surface and a fourth surface connected to the first surface and the second surface and opposing each other, and a fifth surface and a sixth surface connected to the first to fourth surfaces and opposing each other;

a first external electrode disposed on one side of the body, and including a first electrode layer;

a second external electrode disposed on another side of the body, and including a second electrode layer; and a protective layer disposed on an external surface of the body free of the first and second electrode layers, wherein the protective layer extends on the first and second electrode layers, and at least one opening is included in the protective layer in a region disposed on the first electrode layer, and at least another opening is included in the protective layer in a region disposed on the second electrode layer.

2. The all-solid-state battery of claim 1, wherein an area of the opening is 20% to 90% of an area of each region of the protective layer, disposed on a connection portion of the first electrode layer and a connection portion of the second electrode layer.

3. The all-solid-state battery of claim 1, wherein the protective layer is disposed to cover a portion of an end of the first electrode layer and a portion of an end of the second electrode layer disposed on the first surface and the second surface of the body.

4. The all-solid-state battery of claim 1, wherein the protective layer includes one or more among $Al_2O_3$, $SiO_2$, $ZrO_2$, $Ta_2O_3$, $TiO_2$, and $Si_3N_4$.

5. The all-solid-state battery of claim 1, wherein the protective layer includes a multilayer thin film with two or more layers.

6. The all-solid-state battery of claim 1, wherein a thickness of the protective layer is 10 nm or more and 200 nm or less.

7. The all-solid-state battery of claim 1, wherein the first external electrode further includes a first plating layer disposed on the first electrode layer, and the second external electrode further includes a second plating layer disposed on the second electrode layer.

8. The all-solid-state battery of claim 7, wherein the first plating layer includes two or more plating layers, and the second plating layer includes two or more plating layers.

9. The all-solid-state battery of claim 1, wherein the solid electrolyte layer includes an oxide-based solid electrolyte.

10. The all-solid-state battery of claim 1, wherein a buffer layer is further disposed between the solid electrolyte layer and the anode layer and between the solid electrolyte layer and the cathode layer.

11. An all-solid-state battery, comprising:

a body including a plurality of anode layers and a plurality of cathode layers that are alternately stacked with solid electrolyte layers disposed therebetween on opposing surfaces of each anode and cathode layer;

first and second electrode layers disposed on respective external surfaces of the body and respectively connected to the plurality of anode layers and the plurality of cathode layers; and a protective layer disposed on external surfaces of the body to cover an entirety of all external surfaces of the body free of the first and second electrode layers, wherein the protective layer extends on the first and second electrode layers, and at least one opening is included in the protective layer in a region disposed on the first electrode layer, and at least another opening is included in the protective layer in a region disposed on the second electrode layer.

12. The all-solid-state battery of claim 11, wherein the protective layer extends over all peripheral edges of the first and second electrode layers.

13. The all-solid-state battery of claim 12, wherein the all-solid-state battery further comprises first and second conductive resin layers disposed on respective portions of the protective layer and each extending through a respective opening of the one opening and the other opening to respectively connect to the first and second electrode layers.

14. The all-solid-state battery of claim 12, wherein an area of the opening is 20% to 90% of an area of each region of the protective layer, disposed on a connection portion of the first electrode layer and a connection portion of the second electrode layer.

15. The all-solid-state battery of claim 12, wherein the all-solid-state battery further comprises first and second plating layers respectively disposed on the first and second conductive resin layers.

16. The all-solid-state battery of claim 15, wherein the first plating layer includes two or more plating layers, and the second plating layer includes two or more plating layers.

17. The all-solid-state battery of claim 11, wherein the solid electrolyte layer includes an oxide-based solid electrolyte.

18. The all-solid-state battery of claim 11, wherein the all-solid-state battery further comprises first and second plating layers respectively disposed on the first and second electrode layers, and the protective layer is a multilayer thin film with two or more layers and extends between the first electrode layer and the first plating layer and between the second electrode layer and the second plating layer.

* * * * *